United States Patent [19]
Verschueren

[11] Patent Number: 5,989,605
[45] Date of Patent: Nov. 23, 1999

[54] SAUSAGE PRODUCT AND METHOD FOR MAKING

[75] Inventor: Eric M. J. Verschueren, Vosselaar, Belgium

[73] Assignee: Teepak Investments, Inc., Wilmington, Del.

[21] Appl. No.: 09/081,794

[22] Filed: May 20, 1998

Related U.S. Application Data

[63] Continuation-in-part of application No. 08/741,461, Oct. 31, 1996, Pat. No. 5,807,595.

[51] Int. Cl.$^6$ .............................. A22C 11/00; A22C 13/00
[52] U.S. Cl. ............................................ 426/105; 426/413
[58] Field of Search .................... 426/105, 135, 426/413; 138/118.1; 428/34.8

[56] References Cited

U.S. PATENT DOCUMENTS

| | | | |
|---|---|---|---|
| 2,999,756 | 9/1961 | Shiner et al. | 428/34.8 |
| 2,999,757 | 9/1961 | Shiner et al. | 428/34.8 |
| 3,835,113 | 9/1974 | Burke et al. | 536/60 |
| 4,123,589 | 10/1978 | Kolatzki et al. | 426/105 X |
| 4,246,221 | 1/1981 | McCorsley, III | 264/203 |
| 4,296,156 | 10/1981 | Lustig et al. | 426/105 X |
| 4,348,437 | 9/1982 | Lustig et al. | 426/105 X |
| 4,416,698 | 11/1983 | McCorsley, III | 106/163 R |
| 4,590,107 | 5/1986 | Bridgeford | 428/36 |
| 4,784,186 | 11/1988 | Stenger et al. | 138/118.1 |
| 4,944,910 | 7/1990 | Stenger et al. | 426/105 X |
| 5,277,857 | 1/1994 | Nicholson et al. | 264/187 |
| 5,702,783 | 12/1997 | Nicholson et al. | 428/34.8 |

FOREIGN PATENT DOCUMENTS

WO 95/35340  12/1995  WIPO.

*Primary Examiner*—Arthur L. Corbin
*Attorney, Agent, or Firm*—Michael L. Dunn

[57] ABSTRACT

A method for making a sausage product. The method comprises stuffing a wet sausage meat product into a food casing, vertically hanging the stuffed sausage meat product, and drying and curing the stuffed sausage meat product at least partly while the stuffed sausage meat product is vertically hung. In a unique aspect, the food casing comprises a tubular film precipitated from a solution of cellulose in amine oxide and water. The tubular film is longitudinally stretched by from 8 to 30 percent in a dryer and transversely stretched by from −3 to +10 percent while wet, and the stretch is maintained during drying. The transverse stretch is less than 75 percent of the longitudinal stretch. As a result of using the unique casing, dimensional stability of the vertically hung product is improved. The invention further includes a sausage product comprising wet sausage meat product stuffed in a food casing and vertically hung for curing and drying.

11 Claims, 2 Drawing Sheets

SAUSAGE PRODUCT AND METHOD FOR MAKING

This is a Continuation-in-Part Application of U.S. Ser. No. 08/741,461, filed Oct. 31, 1996, now U.S. Pat. No. 5,807,595.

BACKGROUND OF THE INVENTION

This invention relates to dried sausage product encased in a film comprising regenerated cellulose.

Such products are often made by stuffing moist or even wet food product into a tubular food casing and hanging the stuffed food product to dry or cure.

Originally natural gut type casing was used. Other materials were later used, e.g. casings comprising collagen or regenerated cellulose. Such casings could be reinforced, e.g. with cellulose fiber.

All of the above casings, especially those which are non-reinforced, have had a serious sagging or stretching problem, when a wet stuffed casing is suspended by one end, causing an unaesthetic appearance and non-uniform cross section.

Food casings made from regenerated cellulose from xanthate viscose have been known for an extended period of time and can be made using methods well known to those skilled in the art. In particular, xanthate viscose is made by treating cellulose from cotton, wood, or other plant fiber with alkali followed by dissolving in carbon disulfide. The resulting viscose is then extruded through a die to form a tube. The resulting tube is then regenerated, usually by passing it through a coagulating bath containing coagulating materials such as sodium sulfate, and sulfuric acid. The casing is then dried.

U.S. Pat. No. 2,999,756 and 3,835,113 describe such processes in detail.

It is also known that cellulose containing casings can be made by extruding viscose onto a cellulose fiber web, usually a non-woven paper, shaped in the form of a tube, followed by regeneration. Such casings are known as "fibrous" casings.

It has recently been discovered that cellulose casings can also be made by precipitation (regeneration) from solutions of cellulose in a mixture of an amine oxide and water. N-methyl morpholine amine oxide (NMMO) is a preferred amine oxide for this purpose.

The term "regenerated cellulose food casings" as used herein is intended to include both types of casings.

Regenerated cellulose food casings have been successful for a number of reasons including relatively low cost, permeability to smoke, strength and dimensional stability.

Despite the advantages of regenerated cellulose food casings, there are a number of areas where properties could be improved. In particular, as previously discussed, longitudinal dimensional stability is not as good as desired, especially when the casing is wet, i.e. a stuffed food casing will have unacceptable longitudinal stretch when hung vertically, e.g. in a smoke house or for purposes of curing. Such stretch can be as much as ten percent or more. This results in dried sausage product which is unsightly and non-uniform.

While regenerated cellulose food casings have fair permeability, it is still not as good as desired. And in order to obtain sufficient strength, the wall of the casing has been thicker than desired. Thicker walls use more viscose material than desired, decrease permeability and reduce the quantity (unshirred length) of casing that can be shirred (longitudinally folded and compressed) into a standard unit of shirred length.

Attempts have been made to make such casings with thinner walls by variation of processing conditions, e.g. chemical changes in the regenerating bath as described in U.S. Pat. No. 4,590,107. Unfortunately such thin wall casings have had insufficient burst strength and tensile strength for commercial application.

BRIEF DESCRIPTION OF THE INVENTION

Figure 1:
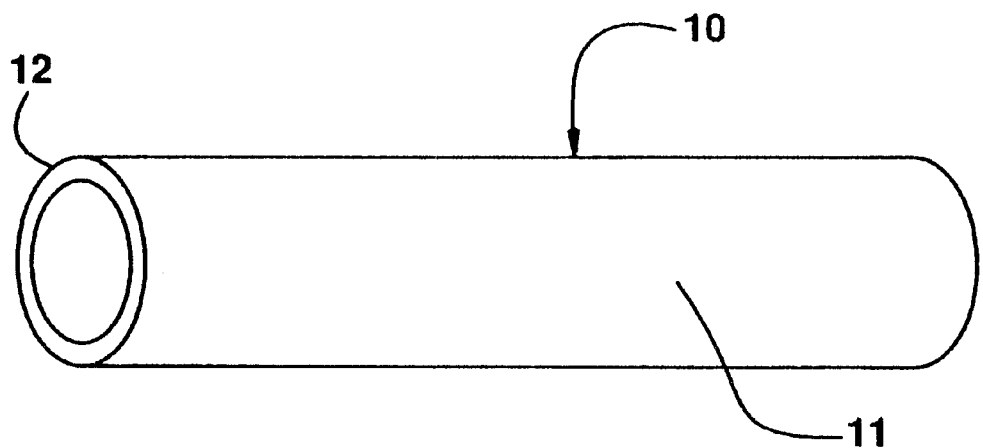
FIG. 1 shows a perspective view of a tubular film of the invention.

In accordance with the present invention a method is provided for making a sausage product. The method comprises stuffing a wet sausage meat product into a food casing, vertically hanging the stuffed sausage meat product, and drying and curing the stuffed sausage meat product at least partly while the stuffed sausage meat product is vertically hung.

In a unique aspect, the food casing comprises a tubular film regenerated from a solution of cellulose in a solvent comprising carbon disulfide or a mixture of amine oxide and water. The tubular film is longitudinally stretched by from 8 to 30 percent and transversely stretched by from −3 to +10 percent awhile wet, and the stretch is maintained during drying. The transverse stretch is less than 75 percent of the longitudinal stretch.

As a result of using the unique casing, dimensional stability of the vertically hung product is much better.

The invention further includes a sausage product comprising wet sausage meat product stuffed in a food casing and vertically hung for curing and drying. The food casing comprising a tubular film regenerated from a solution of cellulose in a solvent comprising carbon disulfide stretched and dried as previously described.

DETAILED DESCRIPTION OF THE INVENTION

In accordance with the invention, the tubular material 10, used to make the dried sausage product of the invention, comprises regenerated cellulose 11 and is a food casing for foodstuffs such as sausage and cheese. The casing is made by extruding a cellulose solution of either derivatized cellulose, e.g., xanthate cellulose (viscose) or a non-derivatized cellulose, e.g., a solution of cellulose in amine oxide and water, either into the form of a tube or to impregnate a fiber web formed in the shape of a tube.

The tubular material is longitudinally stretched after regeneration (precipitation) by from 8 to 30 percent while wet, and usually from 10 to 20 percent, and transversely stretched from the point of extrusion by from −3 to +10 percent. The total transverse stretch from extrusion being less than 75 arid preferably less than 50 percent of the longitudinal stretch after regeneration, to obtain a longitudinal crystalline orientation. In general, the tubular material has a wall thickness 12 of from 75 to 90 percent of a tubular material which is identical except for being longitudinally unstretched. The tubular material may be additionally longitudinally stretched before the dryer by from 0 to 15 percent.

For a food casing of a diameter usual for a hot dog the casing commonly has a wall thickness of between 18 and 25 microns and usually between 21 and 23 microns.

In addition the food casing of the invention has a permeability to smoke and other vapors which is from 20 to 50 percent greater than the same casing except not being longitudinally stretched to obtain the thin wall.

The other physical properties of the casing of the invention, despite having a significantly thinner wall, are surprisingly close to longitudinally unstretched casing. For example the burst pressure is at least 88 percent, and usually at least 95 percent of the burst pressure of a longitudinally unstretched casing. The longitudinal tensile strength is at least 85 percent, usually at least 90 percent and commonly over 100 percent of the longitudinal tensile strength of the same casing except for being longitudinally unstretched.

The product 14 of the invention may be made by stuffing meat emulsion into material 10 and hung from end 16 for drying.

The following examples serve to illustrate and not limit the present invention.

EXAMPLE 1

Figure 2:
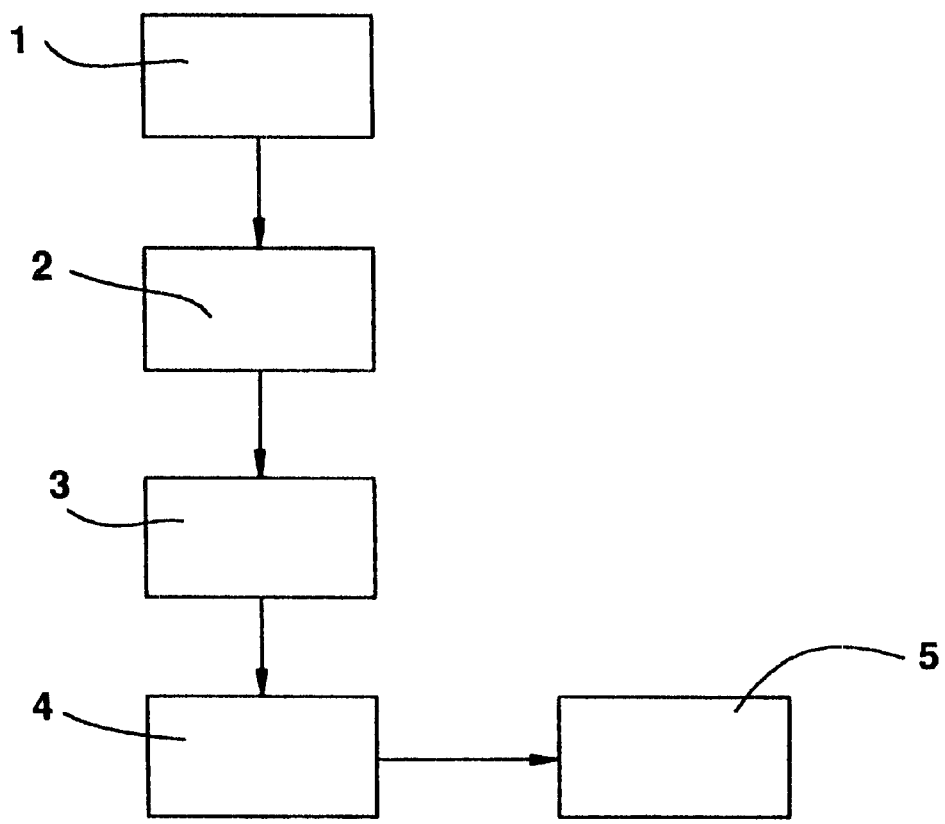
FIG. 2 shows a block diagram of the method of the invention.
Figure 3:
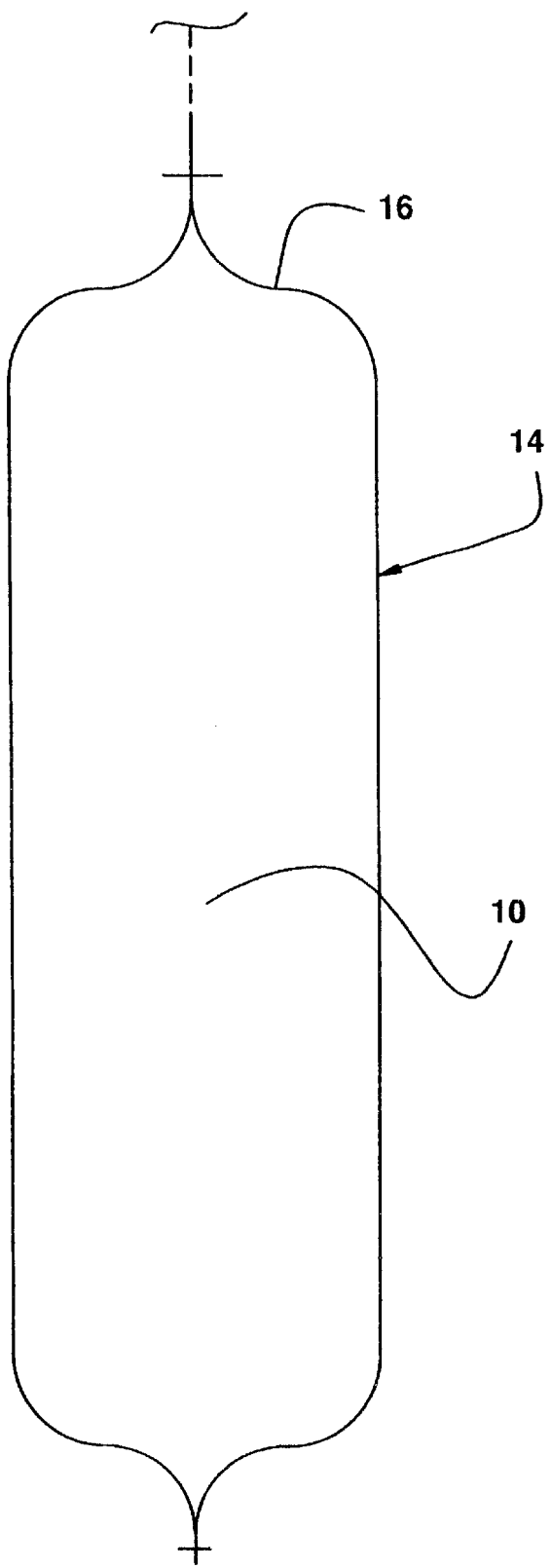
FIG. 3 shows a stuffed sausage product in accordance with the invention.

In general the tubular film used in the invention when precipitated from an amine oxide (e.g., NMMO) water solution is made by the following steps, as shown in the process blocks of FIG. 2:

1. extruding a tube from an NMMO water solution;
2. precipitating the tube in an aqueous bath to form a wet cellulose tubular film;
3. longitudinally stretching the film by from 8 to 30 percent after precipitation and transversely stretching the film by a total of from −3 to +10 percent from extrusion, the total transverse stretch from extrusion being less than 75 percent of the longitudinal stretch after precipitation; and
4. maintaining said stretch during drying, to form a dry tubular film having a wall thickness of from 75 to 90 percent of a tubular film which is identical except for being longitudinally unstretched.

For the method of the invention, food product emulsion is stuffed into the unique casing in Step 5 of FIG. 2.

An NMMO water solution of cellulose is made essentially as described in U.S. Pat. Nos. 4,246,221; 4,416,698 and 5,277,857, except as otherwise indicated, is extruded and regenerated substantially as described in U.S. Pat. No. 5,277,857 and WO 9535340. The die is for a code 24 casing (about 25.4 mm wet flat stock width). The extrusion speed is set at about 28 feet per minute. The speed at the end of the dryer is varied from about 27 to about 37 feet per minute to vary the stretch from −2.5 percent to +30 percent after precipitation. For purposes of plasticization, the casing is passed twice through tanks containing glycerine at the wet end to obtain a glycerine content of about 15.4 percent. The flow of cellulose solution at the point of extrusion is sufficient to yield a thickness of about one mil if unstretched. After extrusion, the casing is inflated with air to expand the diameter to about 20 mm.

Strength properties are not significantly altered but the thickness of the casing is substantially less and vertical stretch is greatly reduced. Permeability studies show better permeability at the reduced thickness.

Example 2

Casing, as made in Example 1 is stuffed with sausage emulsion and hung for drying. For comparison, a standard unstretched casing made from NMMO water solution as described in Example 1 except not being longitudinally stretched is also stuffed with the same sausage emulsion and hung for drying for the same time period and under the same conditions. The original sausage length in both cases is just over about 13 cm. After drying the sausage product using the longitudinally stretched casing of Example 1 has a length of about 13.5 cm and the sausage casing product using the unstretched casing has a length of about 14.1 cm showing significant stretch.

What is claimed is:

1. A method for making a sausage product which comprises: precipitating a tubular film from a solution of cellulose in amine oxide and water to form a food casing, longitudinally stretching said tubular film by from 10 to 30 percent and transversely stretching said tubular film, while wet, then drying said tubular film in a dryer while maintaining the stretch, said tubular film being sufficiently stretched after precipitation to have a wall thickness of from 75 to 90 percent of an identical tubular film that has not been stretched after precipitation; stiffen a wet sausage meat product into the food casing; vertically hanging the stuffed sausage meat product; and drying and curing the stuffed sausage meat product at least partly while the stuffed sausage meat product is vertically hung.

2. The method of claim 1 wherein the film is transversely stretched by less than 75 percent of the longitudinal stretch.

3. The method of claim 1 wherein the film is longitudinally stretched by from 10 to 20 percent in the dryer.

4. The method of claim 1 wherein the film has a wall thickness of from 18 to 25 microns.

5. The method of claim 1 wherein the film is an unreinforced cellulose film.

6. The method of claim 1 wherein the film is a cellulose fiber reinforced cellulose film.

7. A sausage product comprising a wet sausage meat product stuffed in a food casing and vertically hung for curing and drying, said food casing comprising a tubular film which has been precipitated from a solution of cellulose in amine oxide and water and dried in a dryer, said tubular film being precipitated and then longitudinally stretched by from 10 to 30 percent and transversely stretched, while wet, the stretch being maintained in the dryer, said tubular film being sufficiently stretched after precipitation to have a wall thickness of from 75 to 90 percent of an identical tubular film that has not been stretched after precipitation.

8. The product of claim 7 wherein the film is longitudinally stretched by from 10 to 20 percent.

9. The product of claim 7 wherein the film has a wall thickness of from 18 to 25 microns.

10. The product of claim 7 wherein the film is an unreinforced cellulose film.

11. The product of claim 7 wherein the film is a cellulose fiber reinforced cellulose film.

* * * * *

UNITED STATES PATENT AND TRADEMARK OFFICE
CERTIFICATE OF CORRECTION

PATENT NO. : 5,989,605
DATED     : November 23, 1999
INVENTOR(S) : Eric M.J. Verschueren It is certified that error appears in the above-identified patent and that said Letters Patent is hereby corrected as shown below:

Claim 1, line 10, delete "stiffen", and insert --stuffing--

Signed and Sealed this

Thirtieth Day of May, 2000

Attest:

Q. TODD DICKINSON

Attesting Officer     Director of Patents and Trademarks